UNITED STATES PATENT OFFICE.

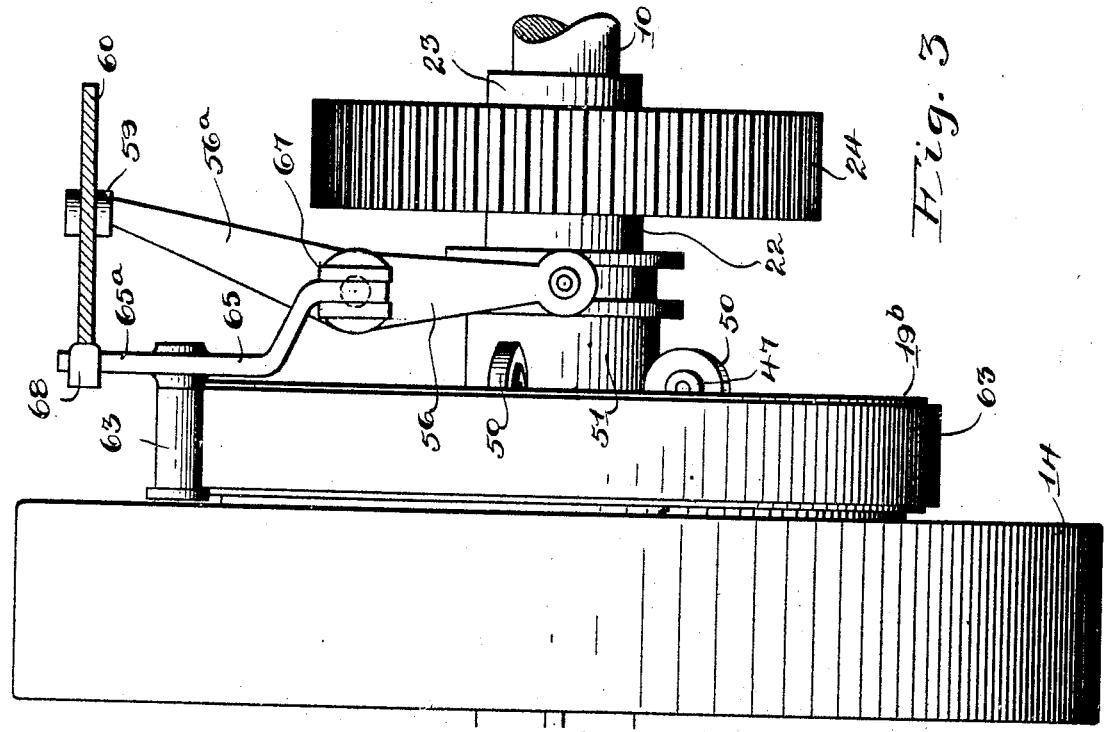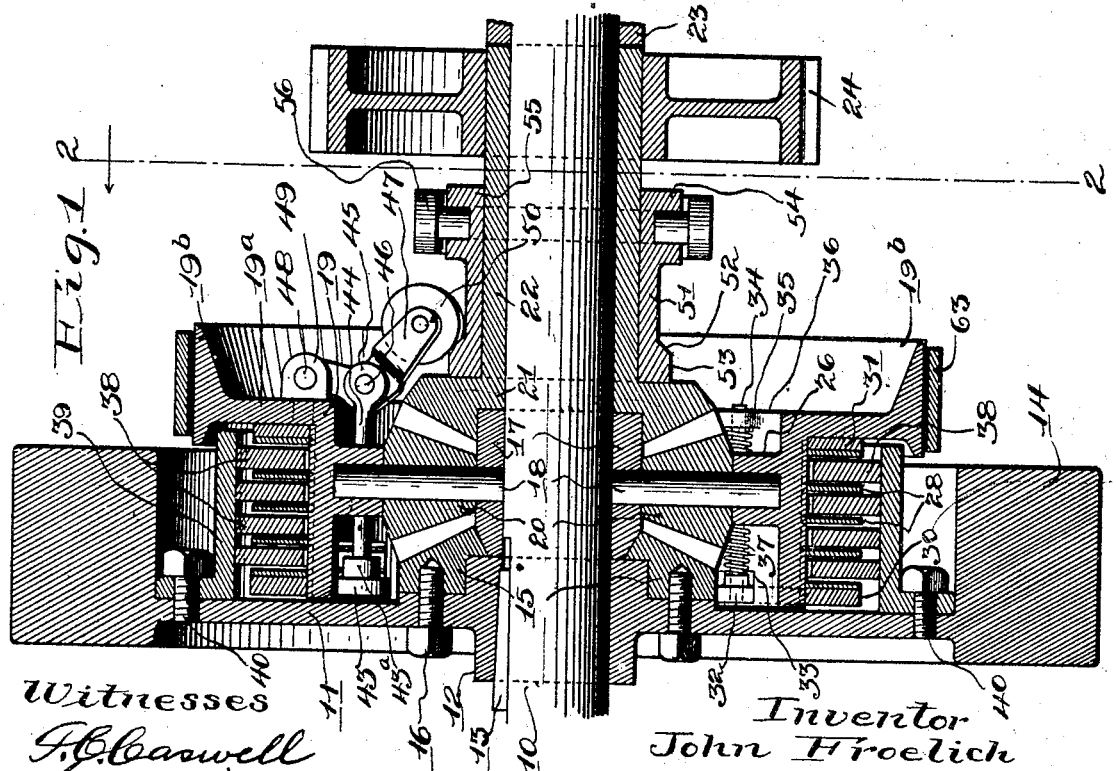

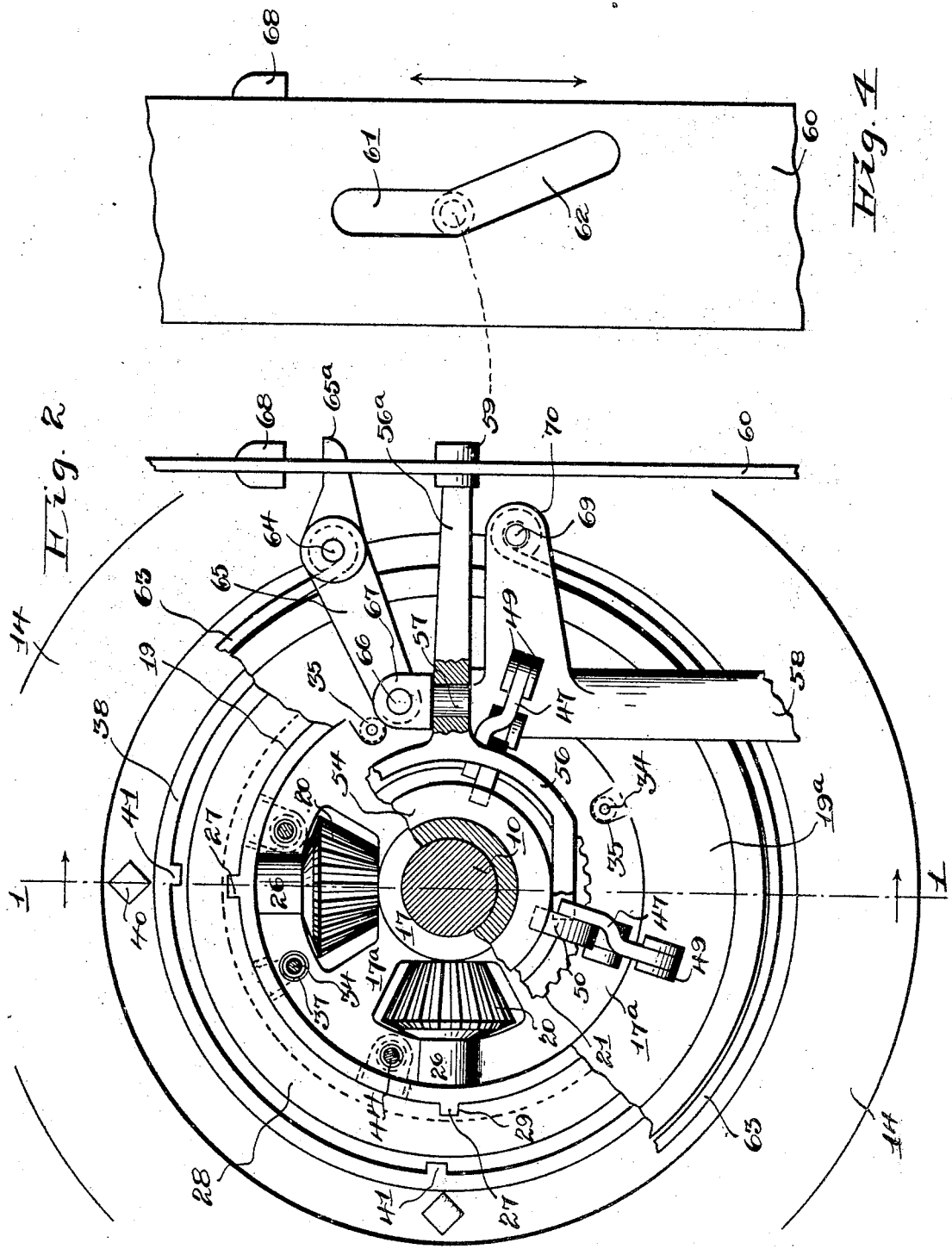

JOHN FROELICH, OF ST. PAUL, MINNESOTA, ASSIGNOR TO LESLIE S. HACKNEY, OF ST. PAUL, MINNESOTA.

REVERSING CLUTCH AND GEAR.

1,230,573.   Specification of Letters Patent.   Patented June 19, 1917.

Application filed June 27, 1914. Serial No. 847,740.

*To all whom it may concern:*

Be it known that I, JOHN FROELICH, a citizen of the United States, residing at St. Paul, in the county of Ramsey and State of Minnesota, have invented new and useful Improvements in Reversing Clutches and Gears, of which the following is a specification.

This invention relates to reversing clutches and gears, the function of which is to change the direction of rotation of a driven shaft by simply moving a lever or pedal. The clutch herein shown is more especially designed for use in automobile power transmission.

One object of the invention is to provide a very compact reversing clutch and one that may be applied directly to an engine shaft and to the flywheel thereof. Such compactness will be found very desirable in motor tractors and other automobiles.

A further object of the invention is to provide a simple, efficient and reliable reversing clutch, which will take hold gradually as the actuating pressure is applied, and will not stick when released.

In the accompanying drawings, Figure 1 is a longitudinal sectional view, taken on the line 1—1 of Fig. 2, of a reversing clutch constructed according to my invention; Fig. 2 is a partial end elevation of the same, certain parts being broken away to expose details of construction—the parts 10 and 22 being sectioned on the line 2—2 of Fig. 1; Fig. 3 is a plan view of my reversing clutch, the slide 60 being shown in section; and Fig. 4 is an elevation of the operative portion of the slide 60 detached.

The numeral 10 designates a driving shaft, *e. g.* the crank shaft of an automobile engine or one axially coupled therewith and 11 is a flywheel web, the hub 12 of which is fastened on the shaft 10 with a key 13. The web 11 is offset to one side of the flywheel rim 14. A bevel geared ring 15 is secured to the flywheel web with cap-screws 16. A spider comprising a hub 17, a web 17ª and a plurality of radial shafts 18 is mounted for relative rotation on the shaft 10, the hub 17 being close to the hub 12. Planetary pinions 20 on the respective shafts 18 mesh with the geared ring 15. A bevel gear wheel 21 meshes with all the said pinions 20 and has an elongated hub 22 freely rotatable on the shaft 10. This gear 21 is recessed to receive one end of the spider hub 17 as shown. A gear wheel 24 from which any machinery may be driven, is fixedly mounted on the hub 22 and a collar 23 is fixed upon the shaft 10 to prevent longitudinal movement of the hub thereon. Said spider also has an annular rim 19, formed with an outwardly extended annular flange 19ª, the periphery of which is provided with a broad flat-faced rim 19ᵇ. This flange and rim will be hereafter called the band-wheel, as it is embraced by a brake-band 63 hereinafter described. The inner periphery of the spider rim 19 is provided with bosses 26 in which the outer ends of the pinion shafts 18 are socketed. The outer periphery of said rim is provided with a plurality of equally spaced, transverse integral ribs 27 hereinafter called key ribs. A number of thin clutch-rings 28 are loosely mounted on said rim 19 and are held against relative rotation thereon by means of notches 29 cut therein, to receive loosely the key-ribs 27. The clutch-rings 28 nearest the flywheel web and the spider flange 19ª are respectively backed by heavier rings 30 and 31, which are mounted on the rim 19 in the same way as are the clutch-rings 28.

The heavy ring 30 adjacent the flywheel, is provided with four inwardly projecting arms 32, which extend freely through slots 33 in the spider rim 19. One of these slots is clearly shown on Fig. 1. To each arm 32 is rigidly secured, as by screw threads, one end of a pin 34 which extends parallel to the shaft 10 and slides through a hole in a guide-lug 35. Said lug projects inwardly from the spider rim 19 at the outer face 36 thereof. On each pin 34 is a helical spring 37 which is under compression and maintains a constant inward pressure upon the arms 32, and thereby, upon the clutch-ring 30. The slots through which the arms 32 pass are adapted to permit said arms to be moved in a direction to compress the said springs 37 so that the clutch-rings 28 are movable toward coöperating clutch-rings 38, yet to be described. The pins 34 and springs 37 pass through openings in the web 17ª, as may be seen on Fig. 2. The clutch-rings 38 are mounted in, and supported by, an annulus 39 which is secured by a flange thereon and cap-screws 40 to the flywheel web 11 just within the rim thereof. This annulus is provided with equally spaced transverse key-ribs 41 which project loosely into corresponding notches cut in the outer peripheries of the clutch-rings 38. Thus the clutch rings are independently slidable in the annulus 39, as the aforesaid clutch-rings 28 are upon the spider. The clutch-rings 38 are arranged alternately with the coacting clutch-rings 28, and the thickness of the former is such as to provide suitable clearance gaps 42 between each clutch-ring and its companions. Of course the inner peripheries of clutch-rings 38 are made to clear the periphery of the rim 19, as shown.

The innermost backing-ring 30, above described as provided with the arms 32, is also provided with four other inwardly projecting arms 43 (see Fig. 1) which pass freely through slots in the spider rim 19 and are spaced midway between the spring-carrying arms. Secured to a boss 43ª on the inner end of each arm 43 is a rod 44 having a bifurcated eye 45 connected by a pivot pin 46 to a bell-crank lever 47, one end of which is fulcrumed on a pin 48 held by a lug 49 secured to the spider flange 19ª. Two of these levers are shown on Fig. 2, from which it will be seen that they extend radially and each lever carries upon its inner end an antifriction roller 50.

The link-rods 44 pass through openings in the web 17ª, as shown on Fig. 2.

Slidable endwise upon the hub 22 of the bevel gear wheel 21, is a collar 51, the inner end of which is formed with an inclined annular cam surface 52 which terminates at its outer margin in a short cylindric surface 53. The collar 51 comprises also an annularly grooved flange 54 which is engaged by the studs 55 on a shipper 56, of ordinary construction, the arm 56ª thereof being fulcrumed on a stem 57 screwed into a brake-band arm 58. Said shipper arm 56ª extends horizontally and terminates in a roller 59.

For actuating the shipper arm 56ª I have shown a vertically movable slide 60 which may be moved by a pedal or a hand lever, as preferred. In the slide 60 is a longitudinal slot 61—62 a part 61 of which extends exactly parallel with the line of motion of the slide and a part 62 of which is inclined, as shown, at an angle with said line of motion. The slot 61—62 receives and guides the roller 59 and the shipper 56—56ª, thereby controlling the position of the collar 51, the angle of the bell-crank levers 47, and the position of the clutch-rings 30 and 28. When the cam collar 51 is in the position shown on Fig. 1, the rollers 50 (which are urged inwardly by the springs 37) are as close to the shaft 10 as possible and the clutch-rings 28 are open. That position allows perfect freedom of rotation of the clutch-rings carried by the flywheel without any tendency to drive the clutch rings carried by the spider.

Assume for illustration that the gear wheel 24 is geared to the driving axle of a motor car, which is standing still while the motor is running and rotating the shaft 10: the load upon the gear 24 will hold it from rotation provided the band-wheel 19ᵇ is free to rotate, as the latter will now be rotated by the revolution of the pinions 20 which are held at one side by the bevel gear 21 and driven at the other side by the bevel gear 15. Thus the band-wheel 19ᵇ may rotate idly when the gear 24 is not transmitting motion.

Continuing the description of the mechanism, and referring to Fig. 2: a brake-band 63 is fastened at one end thereof by a pivot 64, to a lever 65, the inner end of which is pivoted on a pin 66 held by a jaw 67 on the stem 57. Said lever comprises a dog 65ª which stands in the path of an actuating lug 68 on the slide 60. The opposite end of the brake-band 63 is pivotally secured to a pin 69 held in a lug 70 formed on the arm 58 which is supported in any suitable manner on a stationary part of the frame of the mechanism.

Suppose now that the shaft 10 is being rotated by a motor: when the slide 60 is forced down by the operator, (it being compelled to move in a straight line by guides not shown) the lug 68 will engage the dog 65ª, swing the arm 65 downward, and thereby apply tension in opposite directions to the brake-band 63 in such manner as to clamp the brake-band upon the band-wheel rim 19ᵇ. The band-wheel, when brought to a stop, will of course hold the spider 19 from rotating; and as the driving bevel gear 15 is always being rotated by the power shaft 10, the pinions 20 must rotate upon their shafts and will thus drive the bevel gear 21 and the flat faced gear 24, the latter turning in a direction opposite to that of the power-shaft 10 and at one half the speed thereof. This speed is adapted for the reverse motion of automobiles.

During the motion just described, the shipper-roller 59 is held by the slot 61 of the slide 60 in the same position as when the slide was in its neutral position, shown on Figs. 2 and 4.

To stop the reverse motion of the gear-wheel 24, the operator raises the slide 60 so that the lug 68 releases the brake-lever 65 and the brake-band expands, leaving the band-wheel 19ᵇ free, whereupon the load upon the gear-wheel 24 will hold said gear-wheel and bevel-gear 21 from turning, hence the spider and the band-wheel 19ᵇ will be rotated, provided the shaft 10 is still in motion.

To start the gear-wheel 24 forward, the slide 60, being at neutral, is moved upwardly. The cam slot 62 shifts the roller 59, arm 56ª, etc., causing the shipper to move the cam-collar 51 toward the gear wheel 21. The cam surface 52 forces the rollers 50 outwardly, the levers 47 pull the rods 44 outwardly, and said rods draw the inner clutch-rings 28 and 30 in the same direction. Said clutch-rings 30, 28 thereby force both series of clutch-rings 38 and 28 into a solid face-to-face contact. The friction thus created locks the spider to the flywheel through the medium of the clutch-rings. Therefore, the driven bevel gear 21 must now rotate with the power-shaft 10 and turn the gear wheel 24 therewith. The larger diameter (at 53) of the cam 52 is such that it will pass beneath the rollers 50 at the end of the shipper's throw, thus holding the clutch-rings in closed relation without throwing the strain of the pressure back upon the operating slide 60.

It is to be noted that the speed at which the gear wheel 24 is driven may be reduced and varied, when so desired, by applying less than the full braking pressure to the brake-band 63.

Having described my invention, what I claim as new and desire to protect by Letters Patent is:

1. A device of the class described, comprising a power shaft, a spider, a clutch, a driven bevel gear wheel having a sleeve hub loosely mounted on said shaft, means for closing said clutch, said means comprising a cam-collar slidably mounted on said sleeve hub and levers actuated from said collar, a band-wheel carried by the spider, a brake-band for said band-wheel, a movable bar, and means whereby either the cam-collar or the brake-band may be actuated by shifting said movable bar.

2. A device of the class described, comprising a power shaft, a spider, a clutch, a driven bevel gear wheel having a sleeve hub loosely mounted on said shaft, means for closing said clutch, said means comprising a cam-collar slidably mounted on said sleeve hub and levers actuated from said collar, a band-wheel carried by the spider, a brake-band for said band-wheel, a movable bar, means to actuate said cam-collar by movement of said bar in one direction, and independent means to actuate said brake-band by movement of said bar in another direction.

3. A device of the class described, comprising a power shaft, a spider, a clutch, a driven bevel gear wheel having a sleeve hub loosely mounted on said shaft, means for closing said clutch, said means comprising a cam-collar slidably mounted on said sleeve hub and radial levers actuated from the collar, said collar having a short cylindric surface upon which said levers may rest, a band-wheel carried by the spider, a brake-band for said band-wheel, a movable bar and means whereby either the cam-collar or brake-band may be actuated by shifting the movable bar.

4. A device of the class described, comprising a power shaft; a spider; a band-wheel mounted on the spider; a planetary pinion carried by the spider; a bevel gear concentric with and driven by said shaft and also meshing with said pinion; a bevel gear loosely mounted on said shaft and meshing with said pinion; a brake-band embracing said band-wheel; a clutch mounted partly on the spider and adapted to cause the spider to be driven from the shaft in the same direction and at the same speed; mechanism for closing said clutch, said mechanism comprising a plurality of levers, a slidable cam-collar for actuating said levers, and a shipper for said cam-collar; a slidable bar having means for setting said brake-band when moved in one direction; and separate means for actuating said shipper when moved in another direction.

In testimony whereof, I have signed my name to this specification in the presence of two subscribing witnesses.

JOHN FROELICH.

Witnesses:
 F. C. CASWELL,
 R. P. HENDRICKSON.